Figure 1:
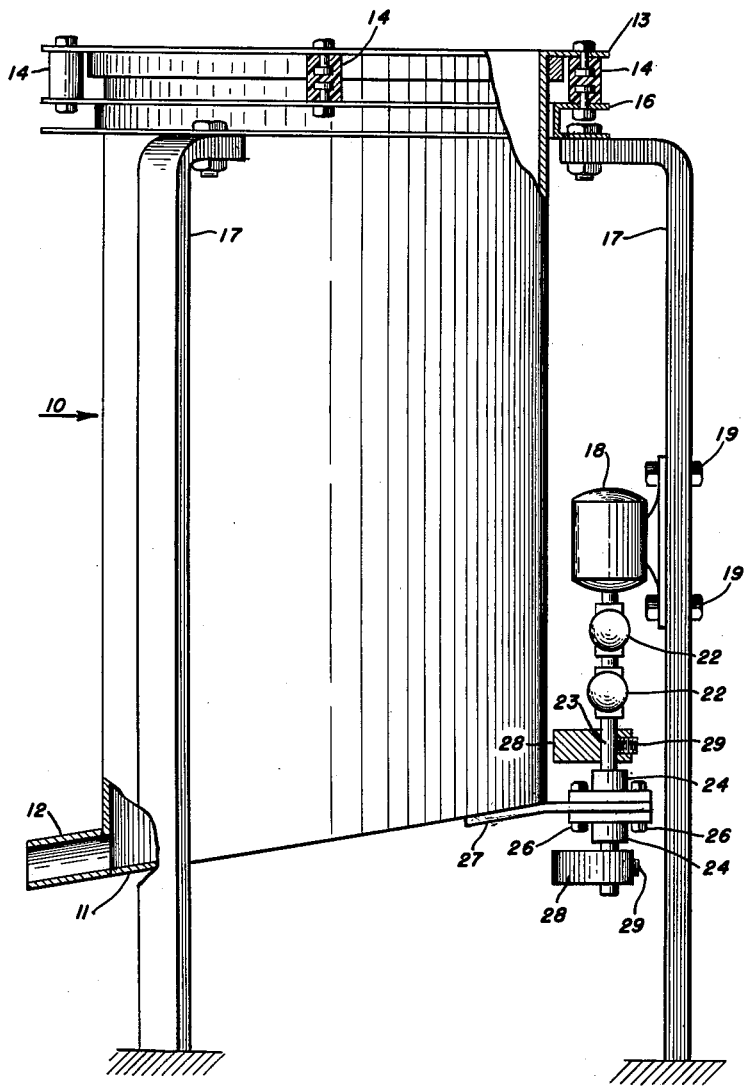

Feb. 19, 1963

E. A. WAHL 3,078,015

VIBRATED HOPPER OR STORAGE BIN

Filed March 3, 1960

2 Sheets-Sheet 1

EUGENE A. WAHL
INVENTOR.

EUGENE A. WAHL
INVENTOR.

3,078,015
VIBRATED HOPPER OR STORAGE BIN
Eugene A. Wahl, 294 Forest Ave., Glen Ridge, N.J.
Filed Mar. 3, 1960, Ser. No. 12,639
3 Claims. (Cl. 222—161)

This invention relates to a hopper, or storage bin, for material and more particularly to a suspended vibrated hopper or storage bin from which even material that is ordinarily very difficult to hopper may be handled.

A common problem encountered in the handling of powdered, granular, pulverized, or the like material, is the feeding of such material from overhead supply or storage bins or hoppers since material being handled often sticks and bridges within the hopper. Conventional means for inducing flow of material from such hoppers includes pulsating air pads lining the walls of the hopper, rotating agitators, vibrated shaker plates, and the like. Rotating agitators are generally impractical on hoppers of large size because of the difficulty of agitating large masses of powdered material. The small amount of vibration provided by shaker plates, and the like, often is not transmitted to the entire mass of material within the hopper whereby bridging and sticking is not eliminated.

The present invention overcomes the above shortcomings of such prior art arrangements by means of a hopper suspension and vibration system whereby the entire bin, or hopper, is sharply and rapidly oscillated with a minimum of power required. With my arrangement, the bin contents become highly fluidized and flow readily out of the bottom. Every particle of material in the bin is subjected to the movement and, therefore, there are no dead zones. Since the material flows readily, the bottom of the bin need slope only slightly. Thus, although the hopper, or bin, may be provided with a conical or pyramidal shaped bottom, a flat bottomed bin may be used with a resultant increase in storage capacity of the bin. The vibrating mechanism may be mounted outside of the bin with no encumbrances within the bin. A smooth walled bin is maintained cleaner for increased sanitation.

An object of this invention is the provision of a vibrated hopper, or bin, from which material flows without sticking or bridging.

An object of this invention is the provision of a vibrated bin, or hopper, arrangement which is of extremely simple construction.

An object of this invention is the provision of a storage bin, or hopper, which is suspended adjacent the upper open end thereof by means of resilient supporting means, and which is vibrated by means attached adjacent the lower end thereof.

An object of this invention is the provision of a storage bin, or hopper, which is vibrated with a generally circular motion in a generally horzontal plane.

These and other objects and advantages will become appearent from the following description when taken with the accompanying drawings. It will be understood that the drawings are for purposes of illustration, and are not to be construed as defining the scope or limits of the invention, reference being had for the latter purpose to the appended claims.

Figure 2:
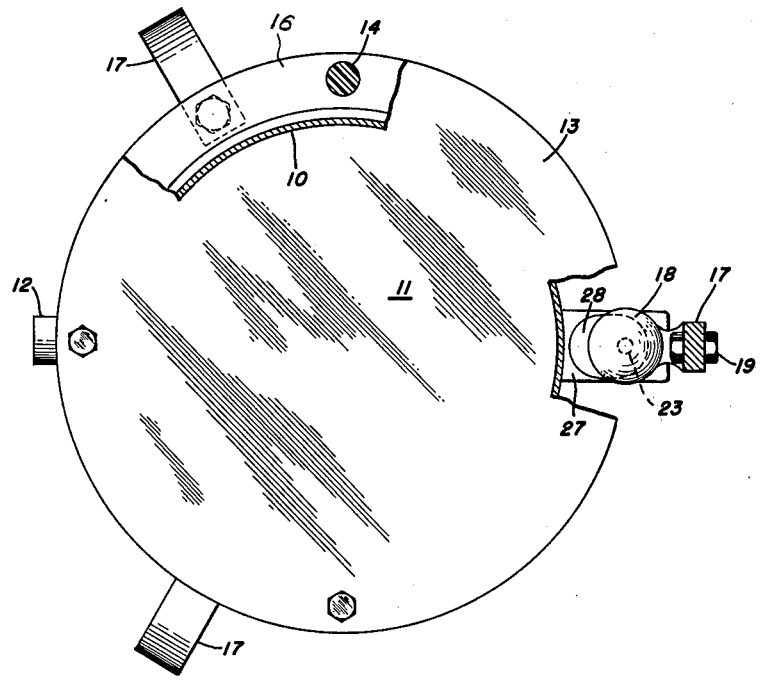

In the drawings wherein like reference characters denote like parts in the several views:

FIGURE 1 is a side elevational view of a vibrated hopper embodying my invention, with portions of the drawing shown broken away for clarity; and FIGURE 2 is a top view, with parts broken away for clarity, of the hopper shown in FIGURE 1.

The storage hopper, or bin, contemplated by this invention, is of general utility as a material storage or supply hopper from which material is intended to flow. The arrangement, as illustrated in the drawings, comprises a hopper 10, which may be of any shape, size or weight. In the drawings, a generally hollow cylindrical hopper is shown having a vertically-disposed axis and a flat and slightly inclined bottom 11. A discharge opening 12, which may be of any size, is located in the side wall of the hopper at the lower end of the inclined bottom.

In accordance with my invention, the hopper is suspended, or supported, adjacent its upper end by resilient mounting means. In the illustrated embodiment of my invention, an annular flange 13 is shown formed on the hopper adjacent the intake end. Resilient mounts 14 are secured at spaced distances apart to the flange 13 and extend downwardly therefrom. In the drawings, the mounts 14 are shown comprising rubber vibration isolators. It will be understood that other solid or pneumatic isolators may be employed, such as coil springs, or the like. The mounts are secured to an annular supporting frame 16 which surrounds the hopper 10 at a spaced distance therefrom. In the drawings, the supporting frame 16 is shown mounted upon supporting legs 17 suitably secured thereto. It will be apparent that the hopper 10 is suspended by the resilient mounts 14 and is free to vibrate, with the mounts isolating the vibrations of the hopper from the supporting structure which includes the frame 16 and legs 17.

In accordance with my invention, the entire suspended hopper is made to vibrate in order to insure the flow of material (not shown) therefrom. For purposes of illustration, an electric motor 18 is shown secured by threaded fastening means 19 to one of the supporting legs 17. The rotatable motor shaft, which extends axially of the hopper, that is, parallel to the hopper axis (or longitudinally thereof) is connected by flexible coupling means 22, 22 to a drive shaft 23, here shown coaxial with the motor shaft 22, which is rotatably supported in sealed, flanged bearings 24, 24 secured by fastening means 26 to a thrust bracket 27. The thrust bracket 27 is secured, as by welding, to the hopper 10 adjacent the lower, or discharge, end thereof. A pair of weights 28, 28 is secured to the drive shaft 23 by set screws 29, 29; with the weights being located on opposite sides of the thrust bracket adjacent the said bearings 24, 24 so that they are balanced thereabout. The center of mass of each of the weights 28, 28 is displaced from the shaft axis (each in the same direction) whereby rotation of the shaft by the motor 18 produces transverse vibration of the shaft. Vibration of the shaft is transmitted through the bearings 24, 24 and the thrust bracket 27 to the lower end of the hopper 10. The entire hopper, especially the lower end portion thereof, is thereby vibrated with a rotary vibratory motion of high amplitude in a horizontal, or transverse, plane. That is, the hopper is made to move in a generally circular path in a plane which extends transversely thereof after orbital displacement from its normal axis.

Any size or weight of bin 10 may be mounted in the above-described manner. The resilient mounts 14 are chosen and properly proportioned with respect to the bin size and weight such that only a relatively small amount of power is needed to sharply and rapidly rotate the bin in a horizontal plane. The amplitude of oscillation is on the order of ⅛″ that is, at least ½₂″ from the normal median position, in all directions. The power required to displace the hopper is returned to the system by the resilient mounting means 14 whereby little power is consumed, even for the vibration of very large hoppers.

With the apparatus of my invention, the material in the hopper becomes highly fluidized, and readily flows out at the bottom. Even long asbestos fibers, wood chips, wet sawdust, greasy pie crust mixes, and the like, are easily hoppered with my arrangement.

Included among the advantages of the bin activator of my invention are: (1) Every particle of material in the bin is subjected to movement and, therefore, no dead zones exist therein; (2) There are no encumbrances inside the hopper, for maximum sanitation; (3) The construction is extremely simple; and (4) The arrangement permits the use of flat-bottomed bins with the resultant increased storage capacity.

Having now described my invention in detail in accordance with the requirements of the patent statutes, various modifications and changes will suggest themselves to those skilled in this art. For example, vibrators of other types than the illustrated eccentric weight system may be used. The vibrator may be attached inside the bin at any desired location on or adjacent the bottom thereof. Further, the bin may be made to vibrate in a vertical, or other plane, rather than the illustrated horizontal plane. Any shaped bin may be employed, with any shaped bottom, although a flat-bottomed bin maximizes the volume thereof, as mentioned above. It is intended that these and other changes and modifications shall fall within the spirit and scope of the invention as recited in the following claims.

I claim:

1. Hoppering apparatus for difficult to handle materials comprising a hopper with a vertically-disposed axis, said hopper having a substantially uniform horizontal cross section throughout its height and having an inclined bottom terminating in a discharge opening formed in the hopper side wall; a hopper support; resilient supporting means connecting the hopper to the support; a motor having a shaft; a thrust bracket secured to the hopper at the lower end thereof and carrying a bearing; a drive shaft extending parallel to the hopper axis and passing through the said bearing, said drive shaft being mechanically coupled to the motor shaft; and a weight eccentrically secured to the drive shaft proximate to said bearing, the arrangement being such that rotation of the said weight results in a lateral, orbital displacement of the hopper in all directions away from its normal axis.

2. The invention as recited in claim 1 wherein the lateral displacement of the hopper from its normal axis is at least $\frac{1}{32}$ inch.

3. The invention as recited in claim 1, including a second weight eccentrically secured to the said drive shaft but on the opposite side of said bearing, the center of mass of the two weights being displaced from the drive shaft axis in the same direction.

References Cited in the file of this patent

UNITED STATES PATENTS

| 2,246,497 | Beck | June 24, 1941 |
| 2,311,373 | Durning | Feb. 16, 1943 |
| 2,566,409 | Greene | Sept. 4, 1951 |

FOREIGN PATENTS

| 643,939 | France | May 22, 1928 |